United States Patent
Raymond

(10) Patent No.: US 10,356,985 B1
(45) Date of Patent: Jul. 23, 2019

(54) PLANT POT WITH SEPARABLE HALVES

(71) Applicant: Edwin Raymond, Clinton Township, MI (US)

(72) Inventor: Edwin Raymond, Clinton Township, MI (US)

( * ) Notice: Subject to any disclaimer, the term of this patent is extended or adjusted under 35 U.S.C. 154(b) by 209 days.

(21) Appl. No.: 15/165,797

(22) Filed: May 26, 2016

(51) Int. Cl.
*A01G 9/02* (2018.01)
*A01G 9/00* (2018.01)

(52) U.S. Cl.
CPC .......... *A01G 9/02* (2013.01); *A01G 2009/003* (2013.01)

(58) Field of Classification Search
CPC ... A01G 9/1073; A01G 2009/003; A01G 9/02
USPC .................................................... 47/66.1, 73
See application file for complete search history.

(56) References Cited

U.S. PATENT DOCUMENTS

| | | | | |
|---|---|---|---|---|
| 576,850 A * | 2/1897 | Iken | ........................ | A01G 27/04 47/80 |
| 726,766 A * | 4/1903 | Schaefer | .............. | A01G 9/0295 47/73 |
| 1,272,713 A * | 7/1918 | Reily | ...................... | A01G 27/02 47/79 |
| RE16,690 E * | 7/1927 | Everett | ..................... | A01G 9/02 47/77 |
| 2,058,934 A * | 10/1936 | Yohe | ......................... | A01G 9/02 47/31 |
| 2,387,340 A | 10/1945 | Moriarty | | |
| 2,594,307 A | 4/1952 | Valenzuela | | |
| 2,960,799 A | 11/1960 | Schneider | | |
| 4,216,622 A * | 8/1980 | Hollenbach | ............ | A01G 9/029 47/71 |
| 5,044,120 A * | 9/1991 | Couch | ...................... | A01G 9/02 47/73 |
| 5,852,896 A * | 12/1998 | Flasch, Jr. | .............. | A01G 27/02 47/48.5 |
| 7,155,860 B1 * | 1/2007 | Ferguson, III | ........... | A01G 9/02 248/219.4 |
| 7,703,240 B2 * | 4/2010 | Watson | ................... | A01G 27/06 47/65.5 |
| 9,668,428 B1 * | 6/2017 | Frame | ....................... | A01G 9/02 |
| 2006/0156625 A1 * | 7/2006 | Abney, II | .................. | A01G 9/02 47/73 |
| 2007/0227068 A1 * | 10/2007 | Cataldi | .................... | A01G 9/02 47/66.1 |

(Continued)

FOREIGN PATENT DOCUMENTS

JP 2008099651 A * 5/2008

*Primary Examiner* — Son T Nguyen

(57) ABSTRACT

A plant pot with separable halves including a first container half having an upright first interior shell and an upright first exterior shell. A plurality of first aeration openings is disposed within the first interior shell. A second container half has an upright second interior shell, an upright second exterior shell, and a base unit having an upper surface, a lower surface, and a cavity disposed between the upper surface and the lower surface. A plurality of second aeration openings is disposed within the second interior shell. A plurality of dowel pins is disposed on each of a pair of second side portions of the second container half, and a plurality of slots is disposed on each of a pair of first side portions of the first container half. One of the plurality of dowel pins is selectively engageable within one of the plurality of slots.

2 Claims, 3 Drawing Sheets

(56) References Cited

U.S. PATENT DOCUMENTS

2013/0042528 A1\* 2/2013 Nason ................ A01G 13/0281
  47/65.7
2013/0133255 A1\* 5/2013 Wu ......................... A01G 9/02
  47/66.1

\* cited by examiner

PLANT POT WITH SEPARABLE HALVES

BACKGROUND OF THE INVENTION

Various types of plant pots are known in the prior art. However, what has been needed is a plant pot with separable halves including a first container half having an upright first interior shell and an upright first exterior shell. A plurality of first aeration openings is disposed within the first interior shell. What has been further needed is a second container having an upright second interior shell, an upright second exterior shell, and a base unit having an upper surface, a lower surface, and a cavity disposed between the upper surface and the lower surface. A plurality of second aeration openings is disposed within the second interior shell. Lastly, what has been needed is a plurality of dowell pins disposed on each of a pair of second side portions of the second container half and a plurality of slots disposed on each of a pair of first side portions of the first container half. One of the plurality of dowell pins is selectively engageable within one of the plurality of slots so that the first container half is attachable to the second container half. The plant pot with separable halves thus allows a user to easily transplant a plant without putting undue stress on the plant.

FIELD OF THE INVENTION

The present invention relates to plant pots, and more particularly, to a plant pot with separable halves.

SUMMARY OF THE INVENTION

The general purpose of the present plant pot with separable halves, described subsequently in greater detail, is to provide a plant pot with separable halves which has many novel features that result in a plant pot with separable halves which is not anticipated, rendered obvious, suggested, or even implied by prior art, either alone or in combination thereof.

To accomplish this, the present plant pot with separable halves includes a semicylindrical first container half having a semicylindrical upright first interior shell, a semicylindrical upright first exterior shell, an arc-shaped top side, an arc-shaped bottom side, a pair of elongated rectangular first side portions extended between the first interior shell and the first exterior shell, and a first chamber disposed between the first interior shell and the first exterior shell. A plurality of first aeration openings is continuously disposed within the first interior shell of the first container half.

The plant pot with separable halves further includes a semicylindrical second container half having a semicylindrical upright second interior shell, a semicylindrical upright second exterior shell, an arc-shaped upper side, an arc-shaped lower side, a pair of elongated rectangular second side portions extended between the second interior shell and the second exterior shell, a second chamber disposed between the second interior shell and the second exterior shell, and a circular horizontally disposed base unit attached to the lower side, the base unit having an upper surface, a lower surface, and a cavity disposed between the upper surface and the lower surface. A plurality of second aeration openings is continuously disposed within the second interior shell of the second container half. A plurality of drainage openings is continuously disposed within each of the upper surface of the base unit of the second container half and the lower surface of the base unit of the second container half.

A plurality of dowell pins is continuously disposed on each of the pair of second side portions of the second container half from proximal the upper side to proximal the lower side, and a plurality of slots is continuously disposed on each of the pair of first side portions of the first container half from proximal the top side to proximal the bottom side. A circumference of each of the plurality of dowell pins is approximately equal to a circumference of each of the plurality of slots, thus allowing one of the plurality of dowell pins to be selectively engageable within one of the plurality of slots. The first container half is then attachable to the second container half when one of the plurality of dowell pins is engaged within one of the plurality of slots. A combined circumference of the bottom side of the first container half and the lower side of the second container half is approximately equal to a circumference of the base unit of the second container half. The removability and, alternately, the attachability of the first container half to the second container half allows for easier transplanting of a plant disposed within the attached first container half and the second container half, with less stress on the plant.

Each of the plurality of first aeration openings and second aeration openings are structured to allow airflow to a plant disposed within the plant pot. The plurality of drainage openings disposed within each of the upper surface of the base unit of the second container half and the lower surface of the base unit of the second container half is structured to allow water to drain from the plant pot. Each of the plurality of first aeration openings, the plurality of second aeration openings, and the plurality of drainage openings is optionally circular. An optional height between the upper surface of the base unit of the second container half and the lower surface of the base unit of the second container half is one inch.

Thus has been broadly outlined the more important features of the present plant pot with separable halves so that the detailed description thereof that follows may be better understood and in order that the present contribution to the art may be better appreciated.

BRIEF DESCRIPTION OF THE DRAWINGS

Figures

DETAILED DESCRIPTION OF THE DRAWINGS

Figure 1:
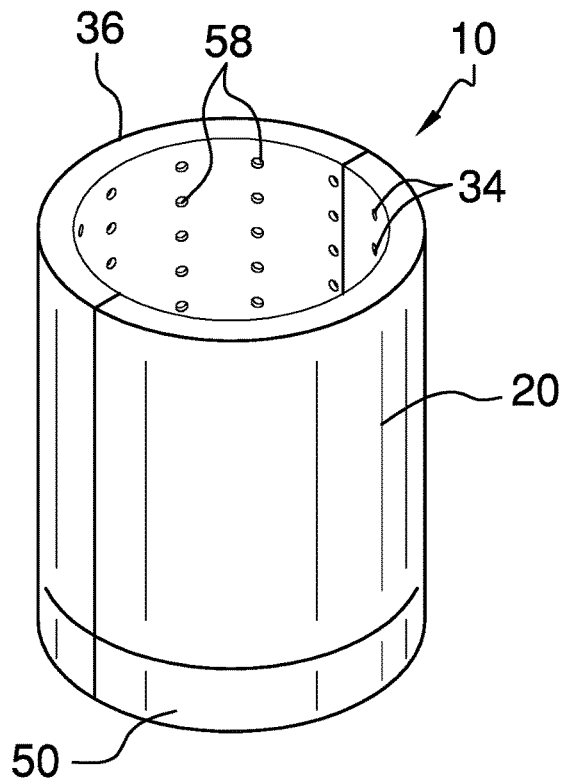
FIG. 1 is a front isometric view.
Figure 2:
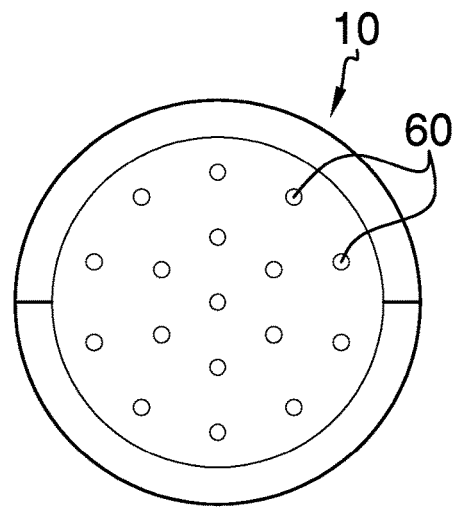
FIG. 2 is a bottom plan view.
Figure 3:
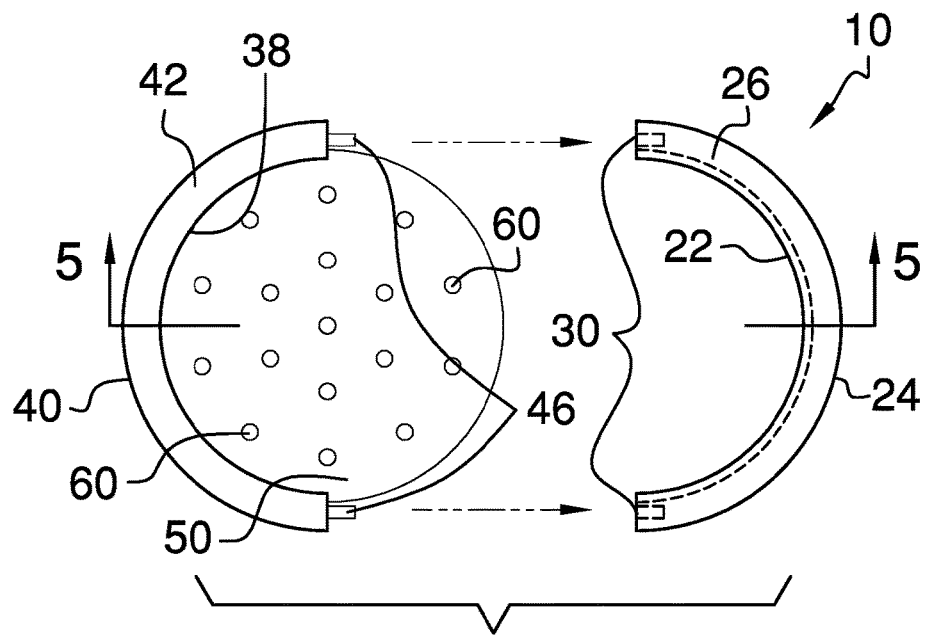
FIG. 3 is a top plan view.
Figure 4:
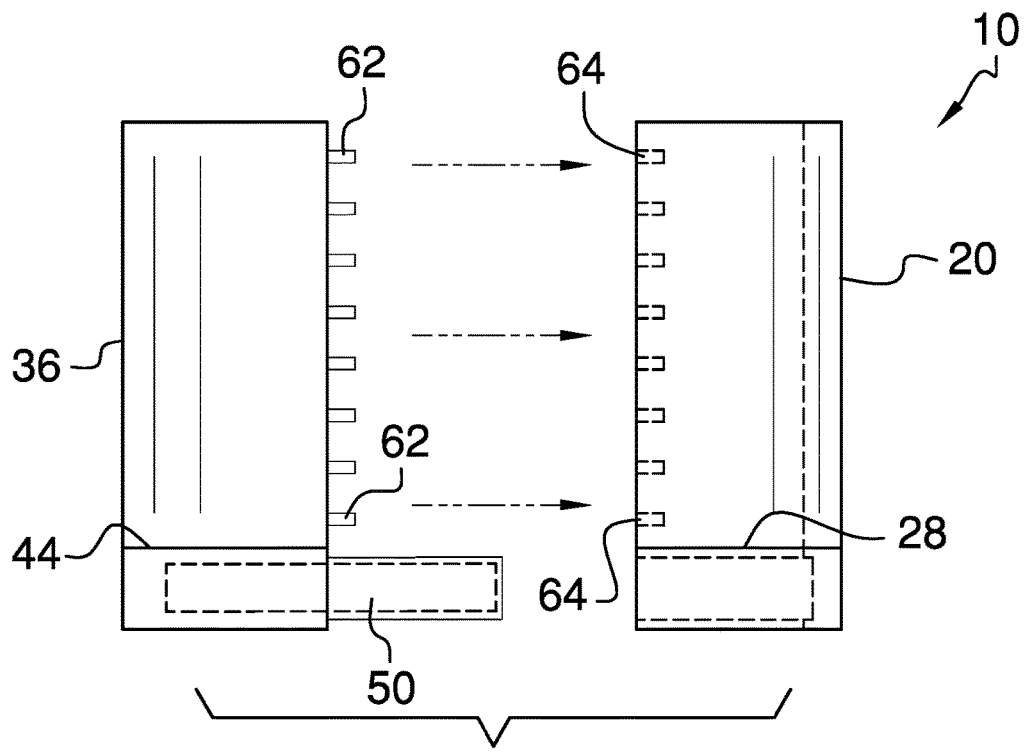
FIG. 4 is a side elevation view.
Figure 5:
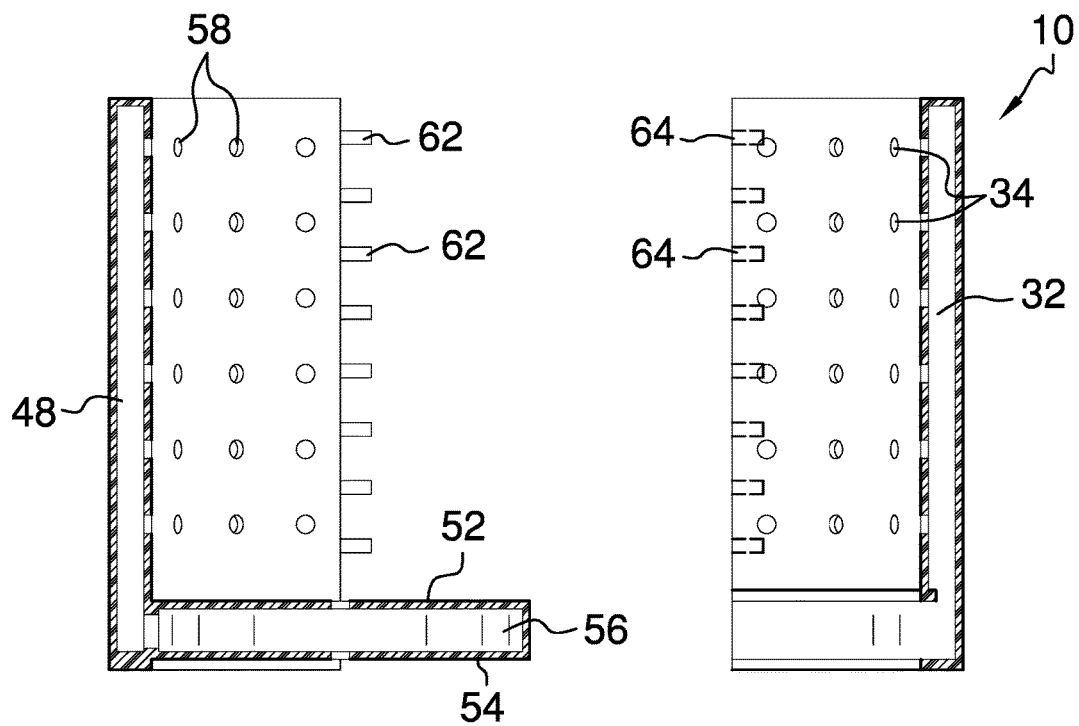
FIG. 5 is a cross-sectional view taken along line 5-5 of FIG. 3.
Figure 6:
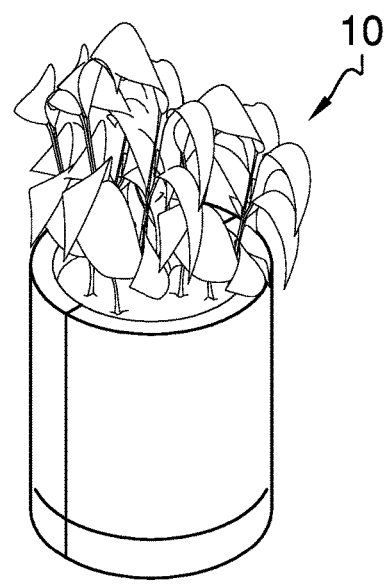
FIG. 6 is an in use view.

With reference now to the drawings, and in particular FIGS. 1 through 6 thereof, an example of the instant plant pot with separable halves employing the principles and concepts of the present plant pot with separable halves and generally designated by the reference number 10 will be described.

Referring to FIGS. 1 through 6 the present plant pot with separable halves 10 is illustrated. The plant pot with separable halves 10 includes a semicylindrical first container half 20 having a semicylindrical upright first interior shell 22, a semicylindrical upright first exterior shell 24, an arc-shaped top side 26, an arc-shaped bottom side 28, a pair of elongated rectangular first side portions 30 extended between the first interior shell 22 and the first exterior shell 24, and a first chamber 32 disposed between the first interior shell 22 and the first exterior shell 24. A plurality of first aeration openings 34 is continuously disposed within the first interior shell 22 of the first container half 20.

The plant pot with separable halves 10 further includes a semicylindrical second container half 36 having a semicylindrical upright second interior shell 38, a semicylindrical upright second exterior shell 40, an arc-shaped upper side 42, an arc-shaped lower side 44, a pair of elongated rectangular second side portions 46 extended between the second interior shell 38 and the second exterior shell 40, a second chamber 48 disposed between the second interior shell 38 and the second exterior shell 40, and a circular horizontally disposed base unit 50 attached to the lower side 44, the base unit 50 having an upper surface 52, a lower surface 54, and a cavity 56 disposed between the upper surface 52 and the lower surface 54. A plurality of second aeration openings 58 is continuously disposed within the second interior shell 38 of the second container half 36. A plurality of drainage openings 60 is continuously disposed within each of the upper surface 52 of the base unit 50 of the second container half 36 and the lower surface 54 of the base unit 50 of the second container half 36.

A plurality of dowell pins 62 is continuously disposed on each of the pair of second side portions 46 of the second container half 36 from proximal the upper side 42 to proximal the lower side 44, and a plurality of slots 64 is continuously disposed on each of the pair of first side portions 30 of the first container half 20 from proximal the top side 26 to proximal the bottom side 28. A circumference of each of the plurality of dowell pins 62 is approximately equal to a circumference of each of the plurality of slots 64, thus allowing one of the plurality of dowell pins 62 to be selectively engageable within one of the plurality of slots 64. The first container half 20 is then attachable to the second container half 36 when one of the plurality of dowell pins 62 is engaged within one of the plurality of slots 64. A combined circumference of the bottom side 28 of the first container half 20 and the lower side 44 of the second container half 36 is approximately equal to a circumference of the base unit 50 of the second container half 36.

The inventor claims:

1. A plant pot with separable halves comprising:
   a semicylindrical first container half having a semicylindrical upright first interior shell, a semicylindrical first exterior shell, an arc-shaped top side, an arc-shaped bottom side, a pair of elongated rectangular first side portions extended between the first interior shell and the first exterior shell, and a first chamber disposed between the first interior shell and the first exterior shell;
   a plurality of first aeration openings continuously disposed within the first interior shell of the first container half;
   a semicylindrical second container half having a semicylindrical upright second interior shell, a semicylindrical upright second exterior shell, an arc-shaped upper side, an arc-shaped lower side, a pair of elongated rectangular second side portions extended between the second interior shell and the second exterior shell, and a circular horizontally disposed base unit attached to the lower side, the base unit having an upper surface, a lower surface, and a cavity disposed between the upper surface and the lower surface;
   a plurality of second aeration openings continuously disposed within the second interior shell of the second container half;
   a plurality of drainage openings continuously disposed within each of the upper surface of the base unit of the second container half and the lower surface of the base unit of the second container half;
   a plurality of dowell pins continuously disposed on each of the pair of second side portions of the second container half from proximal the upper side to proximal the lower side; and
   a plurality of slots continuously disposed on each of the pair of first side portions of the first container half from proximal the top side to proximal the bottom side;
   wherein a circumference of each of the plurality of dowell pins is approximately equal to a circumference of each of the plurality of slots;
   wherein one of the plurality of dowell pins is selectively engageable within one of the plurality of slots;
   wherein the first container half is attachable to the second container half when one of the plurality of dowell pins is engaged within one of the plurality of slots;
   wherein a combined circumference of the bottom side of the first container half and the lower side of the second container half is approximately equal to a circumference of the base unit of the second container half;
   wherein each of the plurality of first aeration openings, the plurality of second aeration openings, and the plurality of drainage openings is circular;
   wherein a height between the upper surface of the base unit of the second container half and the lower surface of the base unit of the second container half is one inch.

2. A plant pot with separable halves comprising:
   a semicylindrical first container half having a semicylindrical upright first interior shell, a semicylindrical first exterior shell, an arc-shaped top side, an arc-shaped bottom side, a pair of elongated rectangular first side portions extended between the first interior shell and the first exterior shell, and a first chamber disposed between the first interior shell and the first exterior shell;
   a plurality of first aeration openings continuously disposed within the first interior shell of the first container half;
   a semicylindrical second container half having a semicylindrical upright second interior shell, a semicylindrical upright second exterior shell, an arc-shaped upper side, an arc-shaped lower side, a pair of elongated rectangular second side portions extended between the second interior shell and the second exterior shell, and a circular horizontally disposed base unit attached to the lower side, the base unit having an upper surface, a lower surface, and a cavity disposed between the upper surface and the lower surface;
   a plurality of second aeration openings continuously disposed within the second interior shell of the second container half;
   a plurality of drainage openings continuously disposed within each of the upper surface of the base unit of the second container half and the lower surface of the base unit of the second container half;
   a plurality of dowell pins continuously disposed on each of the pair of second side portions of the second container half from proximal the upper side to proximal the lower side;

a plurality of slots continuously disposed on each of the pair of first side portions of the first container half from proximal the top side to proximal the bottom side;

wherein a circumference of each of the plurality of dowell pins is approximately equal to a circumference of each of the plurality of slots;

wherein one of the plurality of dowell pins is selectively engageable within one of the plurality of slots;

wherein the first container half is attachable to the second container half when one of the plurality of dowell pins is engaged within one of the plurality of slots;

wherein a combined circumference of the bottom side of the first container half and the lower side of the second container half is approximately equal to a circumference of the base unit of the second container half;

wherein each of the plurality of first aeration openings, the plurality of second aeration openings, and the plurality of drainage openings is circular;

wherein a height between the upper surface of the base unit of the second container half and the lower surface of the base unit of the second container half is one inch.

\* \* \* \* \*